(12) United States Patent
Forshaw

(10) Patent No.: US 9,922,483 B2
(45) Date of Patent: Mar. 20, 2018

(54) MONITORING OCCUPANCY OF A SPACE

(75) Inventor: John Andrew Forshaw, Cirencester (GB)

(73) Assignee: Infrared Integrated Systems Limited, Swan Valley, Northhamptonshire (GB)

( * ) Notice: Subject to any disclaimer, the term of this patent is extended or adjusted under 35 U.S.C. 154(b) by 523 days.

(21) Appl. No.: 13/464,552

(22) Filed: May 4, 2012

(65) Prior Publication Data

US 2012/0281094 A1    Nov. 8, 2012

(30) Foreign Application Priority Data

May 4, 2011    (GB) .................................. 1107411.9

(51) Int. Cl.
| | |
|---|---|
| H04N 7/18 | (2006.01) |
| G07C 11/00 | (2006.01) |
| G07G 1/00 | (2006.01) |
| G07G 3/00 | (2006.01) |

(52) U.S. Cl.
CPC .......... *G07C 11/00* (2013.01); *G07G 1/0009* (2013.01); *G07G 3/00* (2013.01); *H04N 7/18* (2013.01)

(58) Field of Classification Search
CPC ........ G07F 19/207; G07F 19/20; G07G 3/003
USPC ....................................................... 348/150
See application file for complete search history.

(56) References Cited

U.S. PATENT DOCUMENTS

| | | | |
|---|---|---|---|
| 5,097,328 A | 3/1992 | Boyette | |
| 6,199,754 B1 * | 3/2001 | Epstein | G06Q 20/1085 235/379 |
| 8,860,811 B2 * | 10/2014 | Golan | G06K 9/00771 348/150 |
| 2004/0091134 A1 * | 5/2004 | Long | G08G 1/005 382/104 |
| 2008/0059274 A1 * | 3/2008 | Holliday | G06Q 10/06315 705/7.31 |
| 2008/0087724 A1 * | 4/2008 | Kobres | A47F 9/048 235/383 |
| 2009/0249342 A1 * | 10/2009 | Johnson | G06Q 10/04 718/101 |
| 2011/0202415 A1 * | 8/2011 | Casares | G06Q 20/20 705/17 |

(Continued)

FOREIGN PATENT DOCUMENTS

| | | |
|---|---|---|
| EP | 0 924 668 A2 | 6/1999 |
| EP | 2 105 889 A2 | 9/2009 |

(Continued)

OTHER PUBLICATIONS

IPO Search Report for GB1107411.9 dated Sep. 1, 2011; dated Aug. 31, date of search Aug. 31, 2011.

*Primary Examiner* — Chikaodili E Anyikire
(74) *Attorney, Agent, or Firm* — Zagorin Cave LLP

(57) ABSTRACT

A queue monitoring system for monitoring persons queuing to use electronic transaction apparatus, wherein the apparatus comprises at least one user interface, the system comprising one or more cameras for providing data relating to persons queuing and processing apparatus configured to process the data to determine one or more parameters of the queue, wherein the processing apparatus is additionally configured to receive from the electronic apparatus information that is conveyed to the user interface and to use this information in processing the data.

17 Claims, 2 Drawing Sheets

(56) References Cited

U.S. PATENT DOCUMENTS

2012/0046787 A1* 2/2012 Berrio .................... G06Q 20/10
700/237
2012/0158934 A1* 6/2012 Xiao ...................... G06O 30/02
709/223

FOREIGN PATENT DOCUMENTS

EP        2 109 076 A1   10/2009
WO   WO 2007/124138 A2   11/2007

* cited by examiner

MONITORING OCCUPANCY OF A SPACE

CROSS-REFERENCE TO RELATED APPLICATION

This application claims priority from GB 1107411.9, filed May 4, 2011, the contents of which are hereby incorporated by reference herein in their entirety.

BACKGROUND

Field

The present invention relates to systems for monitoring the occupancy of a space, such as queue monitoring systems.

Background

Queue monitoring systems are used in many applications nowadays. For example, queue monitoring is used in supermarkets, stores and shops to determine the numbers of people waiting to be served and if necessary open or close checkouts according to demand. Such systems may include one or more cameras coupled to computer equipment running algorithms that can use image data to distinguish people from other objects and determine the number of people in a queue with reasonable accuracy.

In the situations where queue monitoring is used, people are usually queuing to use (or have used on their behalf) electronic transaction equipment such as cash machines and ticket dispensers. It would be useful to be able to use information from this equipment to supplement information available from the cameras or other imaging apparatus.

SUMMARY

In one aspect there is provided in the following a method of monitoring occupancy by one or more objects of a space associated with electronic transaction apparatus, the method using processing apparatus configured to process data from one or more sensing devices positioned to monitor the space and comprising:

causing information to be sent from the electronic transaction apparatus to the processing apparatus, and using the processing apparatus to process the information sent from the electronic transaction apparatus and the data from the one or more sensing devices to determine one or more parameters relating to the occupancy of the space.

The parameters relating to the occupancy of the space may for example relate to queuing to use the electronic transaction apparatus or waiting after use of the apparatus as will be described in more detail below.

The parameters may comprise any one or more of:

numbers of persons or shopping units (to be described below) waiting, an example of which is queue length, average waiting time, individual waiting time (or waiting time of a particular shopping unit).

The space associated with the electronic transaction apparatus may be one or both of:

queuing area in front of the transaction apparatus; or a waiting area for those who have used the apparatus.

The foregoing are just some examples of parameters and types of space and do not constitute an exhaustive list.

In some implementations it may be necessary to discriminate between objects, for example to differentiate those waiting to perform a transaction and those awaiting fulfillment. The manner in which this is done is outside the scope of this description. However it should be noted that the parameters may relate to a subset of the objects in the space.

The objects will usually be persons. However the objects may also be vehicles, for example when monitoring a queue to buy a parking ticket. The sensing devices typically used in queue monitoring are also capable of identifying animals.

Thus the system may be used in queue monitoring.

In a particular aspect there is provided in the following a method of monitoring persons queuing to use electronic transaction apparatus, wherein the apparatus comprises at least one user interface, the method comprising receiving image data from one or more cameras relating to persons queuing, processing the image data to determine one or more parameters of the queue, receiving information relating to a current state of the electronic apparatus and using the information in the processing of the image data.

The method may comprise receiving the information relating to a current state of the electronic apparatus directly from the electronic apparatus.

The information relating to a current state of the electronic transaction apparatus may be information that is conveyed to the user interface.

The method may comprise obtaining the information conveyed to the user interface by tapping a communications line to the user interface.

The method may comprise tapping a communications line to a display on which the user interface is displayed.

The method may be used to monitor persons queuing to use multiple transaction apparatus and may comprise receiving information relating to current states of multiple electronic transaction apparatus.

The method may comprise determining from the information relating to a current state of the electronic apparatus one or more operating states of the electronic transaction apparatus and using this state information in the processing of image data.

The method may comprise determining from the information conveyed to the user interface whether the electronic transaction apparatus is available for use.

The method may comprise determining from the information relating to a current state of the electronic apparatus whether or not the electronic transaction apparatus is currently processing a transaction.

The method may comprise determining an operating state of the electronic transaction apparatus from text and/or graphical information conveyed to the user interface.

The state information may be used in the determination of the one or more queue parameters.

There is also provided a computer program product comprising instructions which when implemented on one or more processors in a queue monitoring system causes the system to perform the method described above.

There is also provided in the following a system for monitoring occupancy by one or more objects of a space associated with electronic transaction apparatus, the system comprising one or more sensing devices providing data relating to the occupancy of the space and processing apparatus configured to process the sensing device data and being arranged to perform any of the methods described above.

In another specific aspect there is provided in the following a queue monitoring system for monitoring persons queuing to use electronic transaction apparatus e.g. point of sale (POS) apparatus. The system comprises one or more cameras for providing image data relating to persons queuing and processing apparatus configured to process the image data to determine one or more parameters of the queue, wherein the processing apparatus is additionally configured to receive information relating to a current state of the POS apparatus and to use this information in processing the image data.

A system for monitoring the occupancy of a space may also be used to estimate wait times after an electronic transaction has taken place. For example, in a fast food restaurant, sometimes food is paid for and then customers wait for it to be handed over or delivered. There are other instances where an electronic transaction takes place and is followed by a wait time. This wait time may be referred to as the "fulfilment" time, being often the time taken between an order being placed (e.g. via the electronic transaction) and the actual fulfillment of the order. In this situation also it would be useful to be able to use information from electronic transaction equipment to supplement information available from cameras, sensors or other imaging apparatus.

The terms "electronic transaction apparatus" and "POS apparatus" are not only used in connection with actual sales. For example such apparatus is used for the dispensing of cinema tickets (which may have been paid for already), parking tickets (which may be paid for on leaving the car park), dispensing of cash and other transactions in which a sale does not itself take place at the apparatus itself. Such apparatus is nevertheless generally referred to as POS apparatus in this field and the terms "electronic transaction apparatus" and "POS apparatus" are used interchangeably below and are not limited to apparatus at which a sale is transacted.

The term "camera" used herein is intended to encompass any kind of imaging device. An example of a device suitable for use in this invention is described in EP-A-0853237 entitled "Sensors Using Detector Arrays". The sensor comprises an array of pyroelectric infrared detectors positioned at the focus of an infrared transmitting lens so that radiation from the scene without any imposed modulation is focussed on the array. A microprocessor and readout circuit connected to the array work together to detect the occurrence and position of events within the scene based on signals from the infrared detectors. It should be noted that such a sensor does not necessarily produce a visible image for a user. The signals from the detectors may be interpreted by the microprocessor and readout circuit without the need for any visual readout to be provided or any image actually formed. Sensors of this kind are used in queue monitoring.

The preferred system to be described below is configured such that the processing apparatus receives the information directly from the POS apparatus. Thus for example the information is not received via a POS server as might be present in a large store, or via other equipment with which the POS apparatus is in communication. Thus in this preferred system the data may be raw and may not have been processed to derive the state of the POS apparatus or specific transaction times. This derivation may then be carried out by the processing apparatus.

The electronic transaction apparatus may comprise one or more user interfaces, by which is meant the operating software that derives information to be presented to a user. The term "user" is used to denote a customer or an operator of the POS apparatus but is not limited to such users. Some POS apparatus including the example to be described below includes separate user interfaces for a customer and an operator respectively.

Thus in a preferred implementation, the apparatus comprises at least one user interface and the information relating to a current state of the electronic transaction apparatus is information that is conveyed to the user interface. In other words it is information that is to be presented to a user that is intercepted. The system may then comprise a tap on a communications line to the user interface.

In a system in which more than one user interface is present, it is preferred that the information relating to a current state of the POS apparatus is obtained from a customer interface.

Usually the information to be presented to a user is displayed to the user. In that case the system may comprise a tap on a communication line to a display. However the information need not be displayed. In systems for the blind for example the information is conveyed by audible means such as a speaker.

This system has a number of significant advantages, some of which are as follows:

The information that is conveyed to the user interface is usually suitable to be displayed (or presented audibly) and therefore is not sensitive from a security point of view. It does not include credit card information or any other sensitive financial information, the use of which is severely restricted. Information presented to a customer may be less sensitive than information presented to an operator which is why a customer interface is the preferred source.

The system is able to operate completely independently of the point of sale equipment.

The information that is conveyed to the user interface can simply accessed in a manner sometimes referred to as "tapping" or "sniffing" without loading or otherwise affecting the operation of the POS equipment. This also means that any fault with the queue monitoring system will not affect the POS equipment or any other devices with which the POS equipment is networked. The tap can be taken from a feed to the user interface or, probably more conveniently, from a feed to the display itself.

The tap is hard wired in the example to be described below. Thus the tap may comprise a wired connection to the communications line. However the information can be transmitted wirelessly, for example using a Bluetooth™ connection. It should be noted that in the preferred implementation the tap is unidirectional—information goes one way from the POS equipment to the processing apparatus. Nevertheless there may be applications where bi-directional or multidirectional communication with POS equipment is advantageous.

The POS information can be used in ways to be explained in more detail below to determine when the POS equipment is in one of the following states:

Closed (for normal trading)
Open (for normal trading)
In transaction
Out of transaction The foregoing are examples of states that it is useful to know. One or more others may be determined additionally or alternatively to the foregoing states.

The state information can for example be derived from text, such as ASCII code, or other graphical information presented to the user, e.g via the user interface.

This information can aid in the determination of one or more parameters of the queue. For example, it can assist in the determination that a person has left the queue, i.e. in a shop queue the person has passed the pay point. In some installations, the field of view of the camera stops short of the POS equipment itself, for example just before where the cashier sits. An indication from image data that a person has left the queue can be verified by the POS equipment going from "In transaction" to "Out of transaction" at the same point in time.

To take another example, a parameter of interest is the average waiting time in the queue. This can be skewed if people are queuing in groups, such as family members. Image data alone might indicate that three people completed three separate transactions in 15 minutes and therefore waited an average of 5 minutes each whereas in fact they queued together to make a single transaction and all waited 15 minutes. Similarly the POS information can be used to more accurately determine average times taken to complete a transaction (including or excluding queuing time). Queue monitoring terminology uses the term "shopping unit" for each person or group of persons queuing to use POS equipment. A shopping unit may be one person or a family group queuing together.

The POS data can also be used to confirm camera data indicating a quick "walk through" by a person simply leaving a store without making a transaction. It would usually be desirable to eliminate such persons from the measurement of parameters of the queue.

There are many other parameters that might be measured by the system and for which POS data would be useful. These include number of transactions per hour (transaction rate), scan rate (rate of scanning of items by a bar code scanner) and idle time of POS equipment.

As will be clear from the foregoing, the system may be used to monitor queues for multiple POS apparatus. In some stores it is typical for there to be respective queues for each POS apparatus. In other situations there may be one queue for multiple POS apparatus. In the latter situation customers are often directed to particular POS apparatus as they become available.

Thus a system may be configured for monitoring persons queuing for multiple electronic transaction apparatus in which the processing apparatus is configured to receive information relating to current states of multiple electronic transaction apparatus.

The processing apparatus may be configured to receive from multiple POS apparatus information that is conveyed to respective user interfaces. The processing apparatus may comprise multiple processors. They may be configured such that one (e.g. on the shop floor) is configured to determine the operating state of the POS apparatus (or states if there is more than one POS apparatus) and one or more other processors receive the state information from that processor and use this in conjunction with the processing of image data.

It will be appreciated from the foregoing that the processing apparatus may be configured to determine from the information relating to a current state of the electronic apparatus one or more operating states of the electronic transaction apparatus and to use this state information in the processing of image data. For example the processing apparatus may be configured to determine whether the electronic transaction apparatus is available for use or whether the apparatus is currently processing a transaction.

The processing apparatus of the system may comprise multiple processors. For example, one may be configured to determine the one or more operating states of the transaction apparatus and another of which may be configured to receive state information from the first processor and to use this in conjunction with the processing of image data.

State information derived from information supplied by the electronic transaction apparatus may be used in the determination of one or more queue parameters.

The POS information is not necessarily used at the instant it is received. It might be used to back-correct information derived from image data, for example at the end of a working day. Nevertheless it is important that it is up to date. For the present example ideally there is no more than one second latency in the information. Other applications or system requirements may require lower latency or be able to make use of less up to date information, i.e. higher latency.

In a specific example of the use of POS information, estimated numbers of persons or shopping units queuing to use POS apparatus may be obtained from one or more cameras or other sensors and those estimates may be improved with the use of information obtained from the transaction apparatus. Similarly estimates of current and average queuing times may be derived from camera or sensor data and those may be improved with the use of information obtained from the transaction apparatus.

In another example of the use of POS information, estimated numbers of persons or shopping units waiting for order fulfilment may be obtained from one or more cameras or other sensors. Those estimates may be improved using data from electronic transaction apparatus. As with the previous example, the camera or sensor data may be processed to determine other parameters relating to the occupancy of a space associated with the transaction apparatus. Those other parameters may include current and average waiting times. Estimates of these parameters obtained from camera or sensor data may be improved using data obtained from electronic transaction apparatus.

Information obtained from the transaction apparatus may comprise a so called "T log" which is simply a list of times of completion of electronic transactions. However this information is sometimes compiled by a server or other processor obtaining data from multiple transaction apparatus and is not therefore available from the electronic transaction apparatus itself.

Information obtainable directly from the electronic transaction apparatus might be more rudimentary than a T log as will be described in more detail below. In that case it may be used to infer the current state of the transaction apparatus. An approximation of the T log may be derived from information obtained from the electronic transaction apparatus, possibly with the intermediate step of inferring the current state of the transaction apparatus.

BRIEF DESCRIPTION OF THE DRAWINGS

Embodiments of the invention will now be described by way of example only and with reference to the accompanying drawings in which.

DETAILED DESCRIPTION

Figure 1:
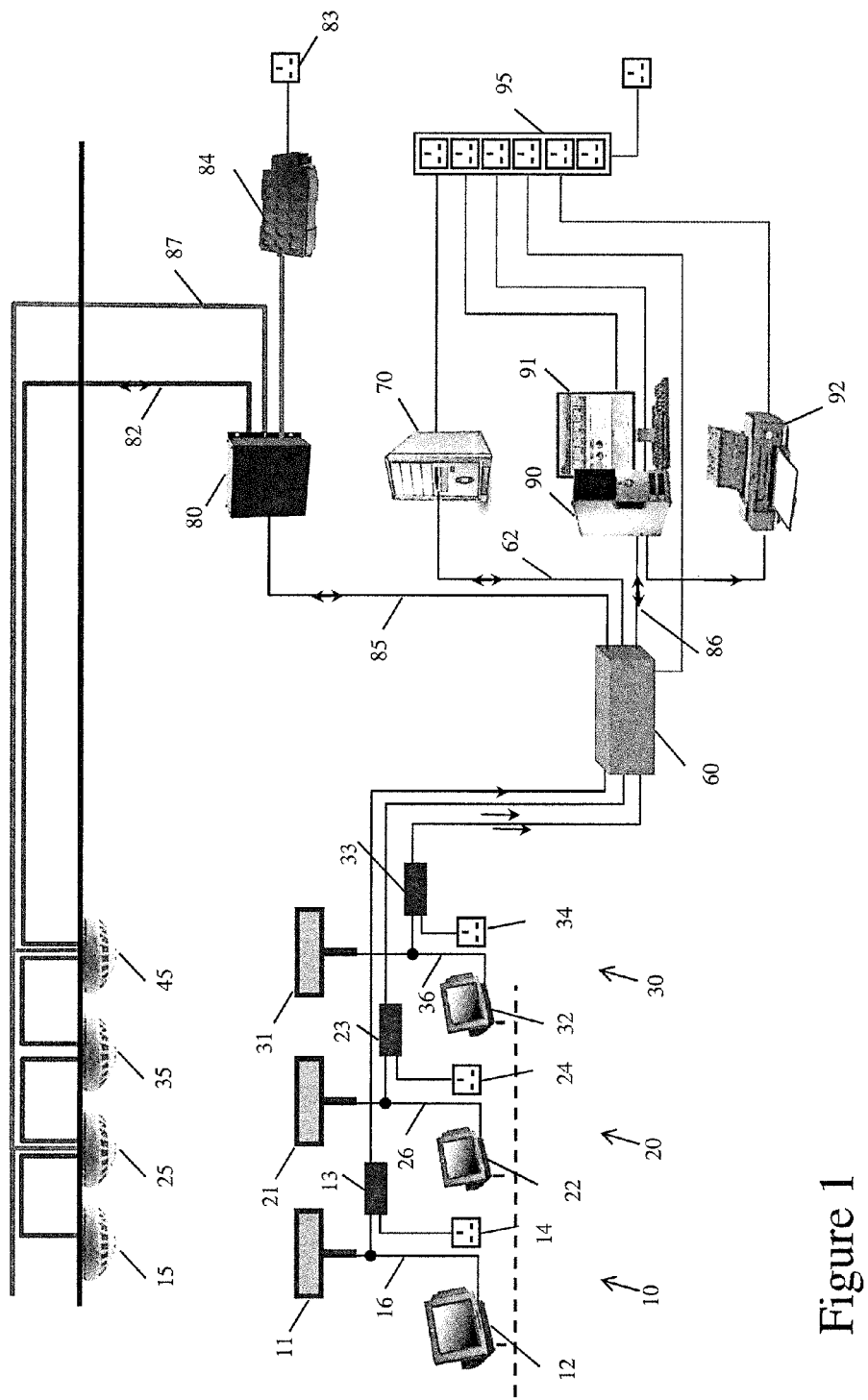
FIG. 1 is a schematic block diagram of the overall architecture of a system according to the invention.

The illustrated system is intended for monitoring queues in a supermarket or similar store and includes three checkouts with respective sets of POS equipment indicated generally by numerals 10, 20 and 30 respectively.

Equipment 10 comprises two user displays, namely a customer display 11 and an operator display 12, as is typical with existing checkout equipment. These displays communicate with each other via cable or other communication line 16. A connector cable is attached to the cable 16 to form a T-junction branching to a signal convertor and power supply unit 13 having a mains power connection 14. Thus signals sent to the customer display are also fed to the convertor and power supply unit 13. It should be noted here that the "sniffing" of signals could be passive and not require any power.

Figure 2:
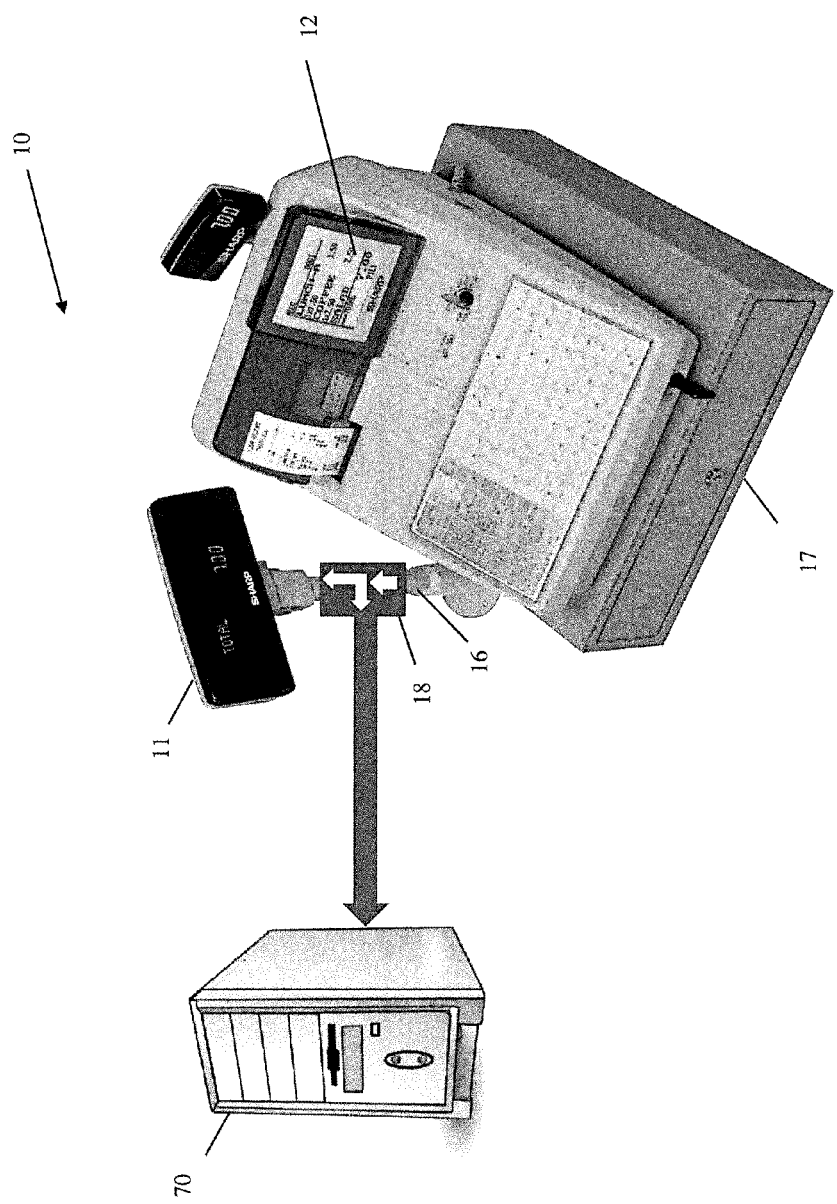
FIG. 2 is an enlarged view of one set of POS equipment.

One set of equipment 10 is shown in more detail in FIG. 2. Here it can be seen that the operator display 12 sits on top of a cash register 17. The communication line 16 is enclosed in a pipe from the cash register 17 to the customer display 11. Processing apparatus forming part of the cash register 11 runs user interface software for respective interfaces to provide signals to the respective displays 11 and 12. A hardware interface 18 duplicates signals bound for the customer display 11. The interface 18 may be a simple tap. It is possible that the cash register 17 or other part of the POS equipment may have a spare port so that a dedicated interface is not required. The tapping of information supplied to the display 11 may be as simple as removing a plug from a socket and plugging in a connector between the plug and socket. The "tap" may include some active circuitry to buffer signals and prevent loading of the display 11. In one implementation it has been found to be useful to provide a resistor to prevent loading of the display 11 in the event that a convertor 13, 23, 33 or power supply 14, 24, 34 fails.

The equipment shown in FIG. 2 will typically be connected to the internal network of the store, not shown.

Similarly equipment 20 comprises customer display 21 and operator display 22, communication cable 26, and signal convertor and power supply unit 23 supplied by mains power connection 24. Equipment 30 comprises customer display 31 and operator display 32, communication cable 36, and signal convertor and power supply unit 33 supplied by mains power connection 34. Equipment 20 and equipment 30 may be identical to equipment 10.

Signals tapped off from the lines 16, 26, 36 by respective hardware interfaces similar to interface 18, are fed to the respective convertors 13, 23, 33 from where they are supplied to a multi-port switch 60 that routes signals between the components of the system.

The system additionally comprises computer 70, usually a PC, receiving and interpreting signals received from the convertors 13, 23, 33 via router 60 in a manner to be described below. (Computer 70 is also shown in FIG. 2.) This could be located on the shop floor at any available location, such as under the desk of a supervisor. Communication line 62 connecting the computer 70 to the switch 60 is a two way connection whereby the output of computer 70 can be supplied to other components of the system.

In the example of FIG. 1 a camera or other sensor, hereinafter referred to as a sensor, is provided for each set of equipment 10, 20, 30. It may not be essential to provide one for each POS equipment. In some implementations it may be possible for a camera or sensor to be shared between POS equipment.

A processor 80 receives signals from the sensors 15, 25, 35 via communication line 82. A line 87 supplies power to the sensors. The processor 80 also receives signals from computer 70 via line 62 and switch 60 and communication line 85. Processor 80 is connected to mains power outlet 83 by power supply 84. Processor 80 will typically be at a location remote from the shop floor.

The system runs queue management software analysing image data relating to persons queuing. The queue management software uses pattern recognition algorithms and other processing techniques to determine parameters of the queues including, for example, numbers of persons in them. The queue management software may be run by processing capability provided in the sensors e.g. housed with the sensor optics. In this situation, data relating to queues and numbers of people in them are sent from the sensors to the processor 80 which then collates received information for the preparation of reports and other purposes.

It will be appreciated that it is equally possible for more of the signal processing to be carried out by the processor 80 in which case the queue management software may run on the processor and the determination of queue lengths etc will be performed at the processor 80. There are numerous ways in which the signal and other processing may be distributed between the processor 80, processors housed in the sensors and other processing capability that may be provided in the system.

An additional sensor or camera 45 may be positioned close to the store entrance to monitor persons entering and leaving the store.

Output signals from the processor 80 are supplied to a further computer 90 via communication line 85, switch 60 and communication line 86. Computer 90 will typically be located at a position where it can be viewed by a shop floor supervisor and is connected to display 91 and printer 92. Power is supplied to computers 70 and 90, display 91, printer 92 and switch 60 from mains outlets generally indicated at 95.

The operation of the components described above will now be described in more detail.

As noted above, information that is supplied to the customer displays 11, 21, 31 is "tapped" and supplied to computer 70. This comprises information that enables computer 70 to determine the state of the POS equipment. This state information is useful in verifying some of the information deducible from the image data obtained from the sensors.

In this particular example of the invention the following state information is obtained from information supplied to the user interface:

Closed (for normal trading)
Open (for normal trading)
In transaction
Out of transaction In other example implementations different state information may be derived for the POS apparatus. This information may be obtained in a number of ways. In the following examples it is derived from information presented to the user.

Open/Closed

A message will usually be displayed to customers or staff indicating that POS equipment is closed for business. This may be as simple as "This checkout is closed" or more generally "This machine is closed". This can be used to determine that the POS equipment is in the closed state. Alternatively it might be a message that only staff would recognise as indicating that the checkout is closed, such as "welcome to XYZ store". Another possibility is that the customer display screen is blank when the POS is not available for use. Clearly then in certain cases the queue monitoring system may need to be tailored for the messages used in the particular POS equipment.

POS equipment may display a variety of messages indicating that it is open for business such as "Next customer press here" (seen on a ticket dispenser). If no such message is available the determination that POS equipment is "open" can be derived in some other way, such as from the scanning of a first item to be purchased in the example of a supermarket or the entry of an access code by an operator.

In/Out of Transaction

In the example of the supermarket the scanning of a first item can be used to determine that a transaction has commenced. The display of the "NEXT CUSTOMER PLEASE" message may be used to indicate that a transaction is complete. The following are some specific examples:

Example of Dealing with Standard Till Messages to Derive Events:

When a transaction is in progress, the items being scanned will be displayed on the customer facing display, then the final price, tender type and any change due will occur at the end of transaction.

The following messages or their like may be effectively ignored:

| POTATOES | £2.99 |
| BREAD | £1.10 |
| CURRY | £2.37 |
| APPLES 2.2 kg | £1.25 |
| TOTAL | £25.97 |
| CHANGE | £4.03 |

Once the transaction is complete, the till is waiting for the next transaction so the display changes to

*NEXT CUSTOMER PLEASE*

The start of this display message is used to trigger the event of <TRANSACTION END>

The till will remain with this message until either another item is scanned or the cashier closes the lane. Assuming the start of a new transaction, the display will show the first item scanned Chocolate bar £0.65

The change in display message from "next customer please" is used to trigger the event of <TRANSACTION START>, the fact that it shows a Chocolate bar as the first item is irrelevant.

Example of Dealing with Non-Standard Till Messages to Derive Events:

Assume that the transaction had ended as in the example above, the sequence of messages would have been:

| APPLES 2.2 kg | £1.25 |
| TOTAL | £25.97 |
| CHANGE | £4.03 |

*NEXT CUSTOMER PLEASE*

One special mode for the till is when it can be set for operator training, generally in this situation customers would not be served through the till and so the system needs to consider the till to be closed. This could be achieved by detecting the message on the till of:

*TILL CLOSED FOR TRAINING* and using this to trigger the event of <LANE CLOSED>

Thus it will be clear from the foregoing that the system may need to be configured to take account of the particular messages that are displayed to users of the particular POS equipment under consideration.

The derivation of POS equipment states is carried out in this example by computer 70 running an algorithm to interpret the data conveyed to the user interface. All of the processing of events or changes of state are handled by computer 70. State information is sent from computer 70 to processor 80 via line 62, switch 60 and line 85. Processor 80 runs algorithms for interpreting image data received from sensors 15, 25, 35 and 45 to determine parameters relating to persons queuing such as numbers of persons in each queue and average wait time. The processor uses information received from computer 70 in the processing of information from the sensors. In practice computer 70 will usually simply report changes of state to processor 80 e.g., the start and end of transactions. It will be appreciated that there are numerous ways the data processing may be distributed between the processor 80 computer 70 and other processing capability that may be provided in the system.

For example, if a set of POS equipment is closed, data from the sensor monitoring persons queuing for that equipment might be ignored. Alternatively data from the sensor might be used to determine whether persons are queuing for that POS all the same because the "closed" message is not sufficiently clear or is not displayed clearly.

Data relating to whether POS is in or out of a transaction can be used to verify information derived from image information such as average wait time, number of "shopping units" queuing. There are some situations in which transactions at the same POS equipment can overlap. For example in some types of stores in Japan it is common for one operator to scan items and another to deal with payments. In that case a new transaction can begin before the previous one is completed. Here POS information will be very useful to augment image data.

Processor 80 can provide real time information to computer 90 for use in the management of staff. For example if queue lengths are too long it might be possible to make additional POS equipment available. In a supermarket this might require additional staff. Thus in one possible set-up computer 90 is configured to query processor 80 for information and to display current queue information, for example in image form or in graphical form. The system might be configured to notify a supervisor if a queue length exceeds a preset threshold or queuing times for POS equipment exceed a threshold. Printer 92 might be used to print management reports. More generally the system may be configured to generate a notification in the event that a parameter of the queue is outside one or more preset limits.

The foregoing describes a particular example of using POS or electronic transaction information in the context of monitoring queue lengths. As noted above, there are other instances where an electronic transaction takes place and is followed by a wait time. In other words, the wait time may commence after the use of the electronic transaction apparatus whereas in the foregoing the queuing time (which is an example of wait time) ends with the use of the electronic transaction apparatus. This wait time taking place after the use of transaction apparatus may be referred to as the "fulfilment" time, being often the time taken between an order being placed (e.g. via the electronic transaction) and the actual fulfilment of the order.

The use of sensing apparatus is being developed to monitor wait times of persons waiting for order fulfilment. As with estimation of queue lengths, information from electronic transaction apparatus may be used to improve the accuracy of the estimated numbers of people awaiting order fulfilment. The illustrated system may be modified in a manner that will be well understood by a person skilled in the art for use in monitoring occupancy of a waiting space for those that have used electronic transaction apparatus.

Persons or shopping units waiting for fulfilment of an order do not necessarily form an orderly queue. Indeed they may mingle with those waiting to use electronic transaction apparatus. However it is possible to discriminate between those waiting for fulfilment and those queuing to use electronic transaction apparatus, for example using CCTV cameras.

Thus a system could be configured to monitor both queuing time prior to a transaction at electronic transaction apparatus and waiting time after the transaction.

What is claimed is:

1. A method of monitoring occupancy by one or more objects of a space associated with a point of sales (POS) transaction apparatus, wherein the POS transaction apparatus is configured to present non-sensitive customer transaction information relating to a state of the POS transaction apparatus to a user, the method comprising:
   intercepting in a communications line to a user interface or a display of the POS transaction apparatus the non-sensitive customer transaction information and generating intercepted non-sensitive customer transaction information;
   conveying the intercepted non-sensitive customer transaction information to a separate processing system which operates independently from the POS transaction apparatus;
   using the separate processing system to process the intercepted non-sensitive customer transaction information to determine a state of the POS transaction apparatus and generate a determined state;
   said separate processing system receiving data from one or more sensing devices positioned to monitor the space;
   using the separate processing system to process the determined state of the POS transaction apparatus and the data received from one or more sensing devices positioned to monitor the space to determine one or more parameters relating to the occupancy of the space;
   intercepting additional non-sensitive information communicated to respective user interfaces or displays of respective additional POS transaction apparatuses and generating intercepted additional non-sensitive information;
   conveying the intercepted additional non-sensitive information to the separate processing system;
   using the separate processing system to process the additional intercepted non-sensitive information to determine additional one or more states of the respective additional POS transaction apparatuses; and
   using the separate processing system to process the additional one or more states of the respective additional POS transaction apparatuses and additional data from the one or more sensing devices to determine additional one or more parameters relating to occupancy of space associated with the respective additional POS transaction apparatuses.

2. The method as claimed in claim 1, wherein intercepting the non-sensitive customer transaction information in the communications line to the user interface or the display of the POS transaction apparatus comprises hardware tapping the communications line.

3. The method as claimed in claim 1, wherein the POS transaction apparatus comprises a display and the non-sensitive customer transaction information intercepted in the communications line comprises information communicated to the display.

4. The method as claimed in claim 1, wherein the non-sensitive customer transaction information intercepted in the communications line relates to a current state of the POS transaction apparatus.

5. The method as claimed in claim 1, wherein the separate processing system determines from the non-sensitive customer transaction information intercepted in the communications line one or more operating states of the POS transaction apparatus.

6. The method as claimed in claim 5, wherein the one or more operating states of the POS transaction apparatus comprise one or more of:
   closed,
   open,
   currently processing a transaction, and
   available for use.

7. The method according to claim 1, wherein the non-sensitive customer transaction information intercepted in the communications line comprises text, graphical information, or both text and graphical information.

8. The method as claimed in claim 1, wherein the data received from the one or more sensing devices comprises image data.

9. The method according to claim 8, wherein the image data relates to persons queuing for the POS transaction apparatus.

10. The method according to claim 1, wherein the one or more objects of the space comprise persons queuing for the POS transaction apparatus, and wherein the one or more parameters relating to the occupancy of the space comprise one or more parameters of the queue.

11. The method according to claim 1, wherein the one or more objects of the space comprise persons awaiting fulfillment of a POS transaction, and wherein the one or more parameters relating to the occupancy of the space comprise one or more parameters relating to fulfillment of the POS transaction.

12. A system for monitoring occupancy by one or more objects of a space associated with a point of sales (POS) transaction apparatus, wherein the POS transaction apparatus is configured to present non-sensitive information relating to a state of the POS transaction apparatus to a user, the system comprising:
   one or more sensing devices configured to provide data relating to the occupancy of the space;
   a hardware tap configured to intercept the non-sensitive information communicated to a user interface or a display of the POS transaction apparatus, the non-sensitive information relating to the state of the POS transaction apparatus and the hardware tap configured to supply intercepted non-sensitive information;
   a separate processing system operating independently of the POS transaction apparatus, wherein the separate processing system is configured to receive the intercepted non-sensitive information from the hardware tap and to receive data from the one or more sensing devices;
   wherein the separate processing system is configured to process the intercepted non-sensitive information and the data from the one or more sensing devices to determine one or more parameters relating to the occupancy of the space;
   a plurality of additional hardware taps configured to intercept additional non-sensitive information communicated to respective user interfaces or displays of respective additional POS transaction apparatuses and generate intercepted additional non-sensitive information;
   wherein the separate processing system is configured to receive the intercepted additional non-sensitive information from the plurality of additional hardware taps and to determine one or more states of the respective additional POS transaction apparatuses based on the additional intercepted non-sensitive information; and
   wherein the separate processing system is configured to process the additional intercepted non-sensitive information and additional data from the one or more sensing devices to determine additional one or more parameters relating to occupancy of space associated with the respective additional POS transaction apparatuses.

13. The system as claimed in claim 12, wherein the POS transaction apparatus is configured to support a wired or wireless connection to communicate the non-sensitive information.

14. A non-transitory computer readable medium comprising instructions, which when executed on one or more processors in a system for monitoring occupancy of a space where a point of sales (POS) transaction apparatus is configured to present non-sensitive customer transaction information relating to a state of the POS transaction apparatus to a user, cause the system to:
process non-sensitive customer transaction information in a separate processing system separate from the POS transaction apparatus to determine a state of the POS transaction apparatus, the non-sensitive customer transaction information intercepted from a communication to a user interface or a display of the POS transaction apparatus, the non-sensitive customer transaction information relating to a state of the POS transaction apparatus and generating a determined state;
process the determined state of the POS transaction apparatus and data from one or more sensing devices positioned to monitor the space to determine one or more parameters relating to the occupancy of the space;
process additional intercepted non-sensitive information communicated to respective user interfaces or displays of respective additional POS transaction apparatuses to determine one or more states of the respective additional POS transaction apparatuses based on the additional intercepted non-sensitive information; and
process the one or more states of the respective additional POS transaction apparatuses and additional data from the one or more sensing devices to determine additional one or more parameters relating to occupancy of space associated with the additional POS transaction apparatuses.

15. The method as recited in claim 1 further comprising:
the separate processing system providing a notification if queue length exceeds a length threshold or if queuing time for the POS transaction apparatus exceeds a time threshold.

16. The system as claimed in claim 12 wherein the separate processing system determines from the intercepted non-sensitive information, one or more operating states of the POS transaction apparatus.

17. The system as claimed in claim 12 wherein the separate processing system is configured to provide a notification if queue length exceeds a length threshold or if queuing time for the POS transaction apparatus exceeds a time threshold.

* * * * *